United States Patent
Barnett et al.

(10) Patent No.: US 6,690,589 B2
(45) Date of Patent: Feb. 10, 2004

(54) INTERLEAVED CONVERTER POWER FACTOR CORRECTION METHOD AND APPARATUS

(75) Inventors: Rick L. Barnett, Dallas, TX (US);
Barry Olen Blair, Garland, TX (US);
Gregory H. Fasullo, Dallas, TX (US);
Donald Marabell, Dallas, TX (US);
Andrew Marsh, Dallas, TX (US)

(73) Assignee: Valere Power, Inc., Richardson, TX (US)

( * ) Notice: Subject to any disclaimer, the term of this patent is extended or adjusted under 35 U.S.C. 154(b) by 158 days.

(21) Appl. No.: 10/085,259

(22) Filed: Feb. 28, 2002

(65) Prior Publication Data

US 2003/0161167 A1 Aug. 28, 2003

(51) Int. Cl.$^7$ ................................. H02M 7/00
(52) U.S. Cl. ........................... 363/72; 323/272
(58) Field of Search ............... 363/65, 69, 71, 363/72; 323/272

(56) References Cited

U.S. PATENT DOCUMENTS

| | | | | |
|---|---|---|---|---|
| 4,425,613 A | * | 1/1984 | Shelly ........................... | 363/26 |
| 5,122,726 A | * | 6/1992 | Elliott et al. ................. | 323/272 |
| 6,320,771 B1 | * | 11/2001 | Hemena et al. ............... | 363/70 |
| 6,346,798 B1 | * | 2/2002 | Passoni et al. .............. | 323/272 |

OTHER PUBLICATIONS

Pressman, Abraham I.; "Power Factor, Power Factor Correction," Chapter 15, *Switching Power Supply Design*, Second Edition, McGraw Hill, pp. 533–561, (no date).
Miwa, Brett A et al.; Abstract of"High Efficiency Power Factor Correction Using Interleaving Techniques"; *IEEE* (0–7803–0485–3/92); Mar. 1992; pp. 557–568.
Balogh, Laszlo et al.; Abstract of "Power–Factor Correction with Interleaved Boost Converters in Continuous–Inductor–Current Mode"; *IEEE* (0–7803–0982–0/93); 1993; pp. 168–174, (no month).
Redl, Richard et al.; Abstract of "Reducing Distoration in Peak–Current–Controlled Boost Power–Factor Correctors"; *IEEE* (0–7803–1456–5/94); May 1994; pp. 576–583.
Canesin, Carlos A. et al.; Abstract of "Analysis and Design of Constant–Frequency Peak–Current–Controlled High–Power–Factor Boost Rectifier with Slope Compensation"; *IEEE* (0–7803–3044–7/96); Jul. 1996; pp. 807–813.
Giral, Roberto et al.; Abstract of "Interleaved Converters Operation Based on CMC"; *IEEE S* (0885–8993/99); vol. 14; No. 4; Jul. 1999; pp. 643–652.
Product data sheet of Unitrode Products from Texas Instruments for a BiCMOS Power Factor Preregulator; product Nos. UCC2817, UCC2818, UCC3817, UCC3818; Feb. 2000—revised Apr. 2001; pp. 1–17; Dallas, Texas.
Product data sheet of Texas Instruments for a BiCMOS Low–Power Current–Mode PWM Controller; product Nos. UCC28C40–UCC28C45 and UCC38C40–UCC38C40–UCC38C45; Aug. 2001; pp. 1–18; Dallas, Texas.

* cited by examiner

*Primary Examiner*—Jessica Han
(74) *Attorney, Agent, or Firm*—Carr LLP

(57) ABSTRACT

Disclosed is an apparatus that equally distributes current from a rectifier circuit to a plurality of power factor correction circuit units by equal current magnitudes and lower component count advantages of peak current sensing with the lower harmonic distortion advantages of average current sensing. The output of a single average current sensing correction circuit in a master controller is logically compared with the output of a peak current sensing circuit in each of a plurality of interleaved master and slave controller units to produce a difference signal used to operate the switch in the switch leg of each controller unit to reduce emi, harmonic distortion and increase power factor toward an in phase condition.

6 Claims, 1 Drawing Sheet

INTERLEAVED CONVERTER POWER FACTOR CORRECTION METHOD AND APPARATUS

TECHNICAL FIELD

The present invention relates in general to power factor correction (PFC) circuitry and, more specifically, how to reduce cost and improve converter specifications when interleaving PFCs.

BACKGROUND

Regulations in various countries have mandated the need for a high power factor in AC/DC converters and other loads that may affect the line power factor. As known in the art, a high power factor condition exists when the alternating current (AC) load is resistive, the current and voltage are in phase and the power factor is 100%. In the industry, one of many standard approaches to obtain a higher power factor condition is to control converter input current using a boost topology. Many basic details relative power factor correction may be found in various textbooks, such as Chapter 15 of "Switching Power Supply Design" Second Edition published by McGraw Hill and Authored by Abraham I Pressman.

One typical control integrated circuit (IC) utilized in the industry is a standardized chip designated as a 2818, a version of which is available from Texas Instruments, Inc. (TI) as a UCC2818. Application notes, entitled "BiCMOS POWER FACTOR PREREGULATOR," are available from TI for a family of ICs including the 2818 IC. The 2818 chip implements a technique known as average current mode control. As the name implies, this technique controls the average input current.

Although the average input current may be sensed with a single resistor placed in the return to the rectified source, a considerable amount of power is dissipated (and wasted) in this approach. Thus, most average current PFC circuits use two current transformers (CTs) for sensing, summing and averaging the current in both a switch leg and diode or non-switch leg of the PFC circuit. CTs, however, add size and cost to a PFC circuit.

One approach to reducing size and weight is to use a single CT in the switch leg of the PFC circuit to detect only the peak switch current. In the industry, this approach is referred to as current mode control (CMC). More detail on an IC that can be used to provide such a peak current controller may be found in an application note from TI, entitled "BiCMOS Low Power Current Mode PWM Controller." It is well known in the industry that the CMC approach is unstable when the switch duty cycle exceeds 50%. The CMC can be made stable by implementing a technique known as slope compensation. This technique is implemented by adding a slope to the current ramp, as set forth in a July 1996 IEEE (APEC) article by C. Canesin, entitled "Analysis and Design of Constant Frequency Peak Current Controlled High Power Factor Rectifier with Slope Compensation" on pp 807–813. A difficulty of such an approach is that CMC does not perform as well as average current mode in PFC applications. More detail on this situation may be obtained from a paper by R. Redl, entitled "Reducing Distortion in Peak-Current-Controlled Boost Power-Factor Correctors," IEEE (APEC) 1994, pp. 576–583.

It is further known in the art that interleaving controllers (paralleling) allows the use of smaller components or, alternatively, components that are not available with high current ratings. Further, electronic emission interference (emi) signals are reduced when using interleaved controllers due to the lower amount of ripple. However, current sharing is not guaranteed when using two average current controllers, as set forth in a paper by L. Balogh, entitled "Power Factor Correction with Interleaved Boost Converters in Continuous-Inductor-Current Mode," IEEE (APEC) 1993, pp. 168–174. When the current is not equally shared between multiple units, the different peak currents can increase the emi and increase design size and cost over what would occur in an optimized interleaved unit. The size and cost increase is generally due to a safety factor being built into the controller design to accommodate unbalanced currents in the interleaved converters. Thus, interleaved PFC units typically are designed using CMC with slope compensation as set forth in a paper by R. Giral, entitled "Interleaved Converters Operation Based on CMC" IEEE (APEC), pp. 643–652.

It has been found that average current mode PFC controllers obtain better power factor than do peak (CMC) controllers. The measurements used in the industry are total harmonic distortion and power factor. The total harmonic distortion in an average current mode PFC is typically improved over a comparable CMC unit.

It would thus be desirable to be able to use interleaved controllers that equally share the load current for low emi and allow the use of low current, lower cost components and lower weight components while obtaining the lower total harmonic distortion available from an average current mode PFC controller.

SUMMARY OF THE INVENTION

The present invention comprises providing peak or CMC control to a master and one or more slave controllers from a switch leg control transformer (CT). Thus, the input current is substantially equally divided between controllers. A further or extra CT, situated in the non-switched leg of only the master controller, is used in combination with the switch leg CT whereby the average current may be determined and used in a single average current controller. The difference between a reference current logically obtained from the average current controller and the actual current commanded by the CMC controller is compared to create a switch leg control signal that may be used by the slave CMC controllers to obtain high power factor.

BRIEF DESCRIPTION OF THE DRAWINGS

For a more complete understanding of the present invention, and its advantages, reference will now be made in the following Detailed Description to the accompanying drawing of FIG. 1, which is a combination block/circuit diagram of the present invention.

DETAILED DESCRIPTION

Figure 1:
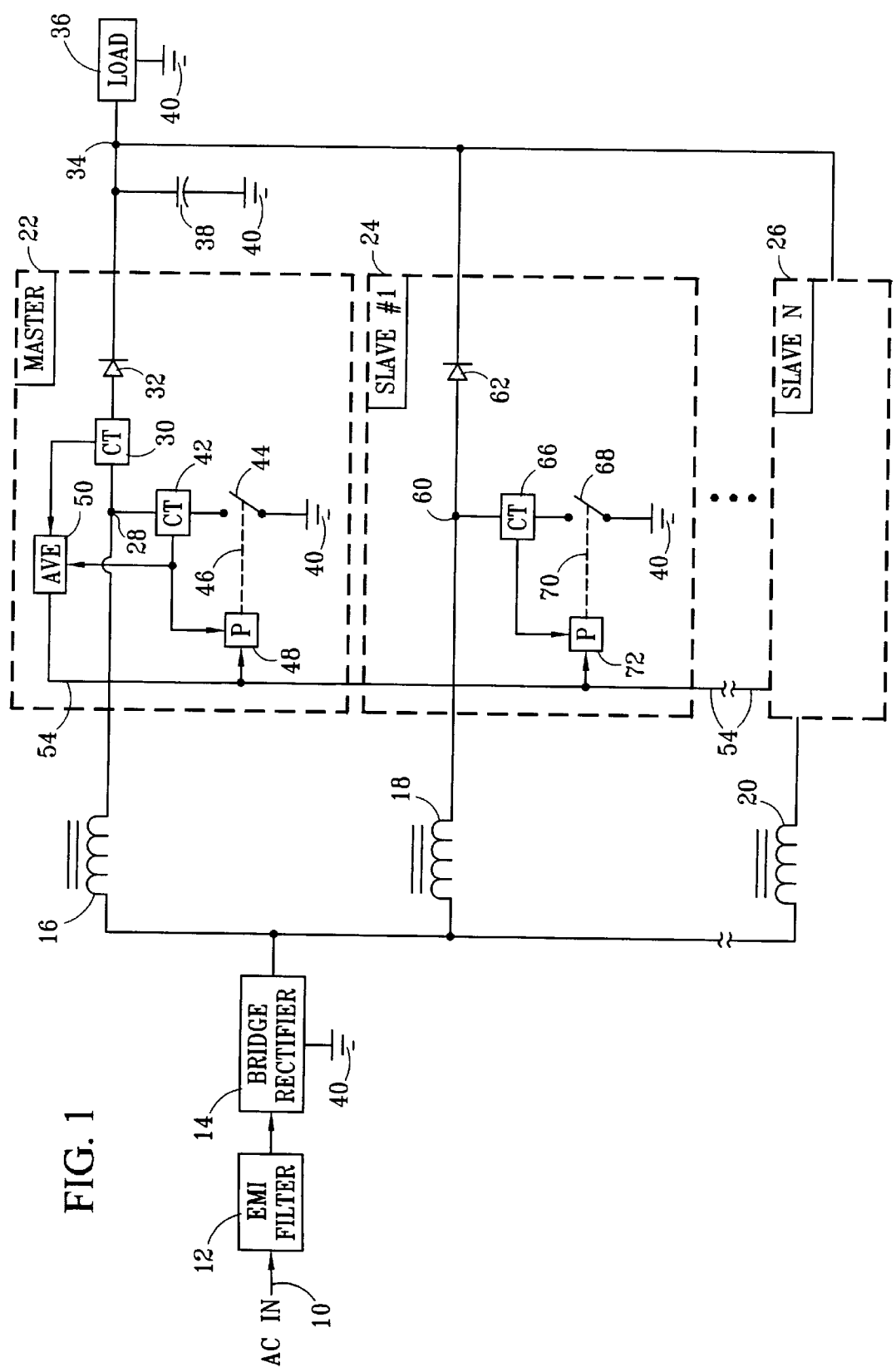

The embodiment shown in FIG. 1 employs a boost converter to accomplish the power conversion. However, it will be apparent that any switch type interleaved converter may be employed. A non-exhaustive list of examples of such other converter types includes converters commonly identified in the industry by the following names: Buck-Boost, Sepic, Flyback, Current Fed Bridge, and Current Fed Half Bridge.

In FIG. 1, an input lead 10 provides an alternating current (AC) voltage through an emi filter 12 to a bridge rectifier 14.

The output of the rectifier 14 is supplied to one end of a plurality of inductances shown as 16, 18 and 20 for supplying current to converters labeled 22, 24 and 26, respectively. The other end of inductance 16 is connected to a junction point 28. Junction point 28 is connected through a non-switched leg CT 30 and a diode 32 to a junction point 34, which serves as an input to a load 36. A capacitance 38 is connected between junction point 34 and a ground or reference potential 40. A switch leg CT 42 is connected in series with a switch 44 between junction point 28 and ground 40. Switch 44 is preferably a semiconductor in the form of an field effect transistor (FET) with a signal input being provided by a dash line labeled 46; however, other suitable switching devices could be employed. The current sensed by CT 42 is provided to a peak current controller 48, which compares the sensed peak current with an error amplifier generated reference signal.

The peak current controller 48 operates to turn switch 44 ON and OFF in accordance with the relative amplitudes of the peak and generated reference signals. The current sensed by CT 42, as well as that sensed by CT 30, are input to the average current controller 50, where they are summed and averaged. The result of summing and averaging is then combined with signals indicative of converter input RMS (root mean square) voltage, converter output voltage and instantaneous input voltage magnitude in accordance with an algorithm described in detail in the 2818 application note mentioned above. An output of this IC, comprising a part of the averaging block 50, is provided on a lead 54. The signal on lead 54 is compared with that obtained from CT 42 in peak controller 48 before supplying the result to operate or actuate the switch 44.

A junction point 60 is connected to the other end of inductance 18. A diode 62 is connected between junction point 60 and junction point 34 of load 36. A switch leg CT 66 is connected in series with a switch 68 between junction point 60 and ground 40. Switch 68 has a dash line 70 representing a control signal input in the manner of switch 44. A peak current controller 72 receives signals indicative of the current sensed by CT 66 and compares this with the error amplifier signal received on lead 54 before applying a combination of the two inputs to control the operation of switch 68 via lead 70.

Any further slave units, such as 26, are constructed substantially identically as is slave unit 24 with the exception of the timing of the input to switch 68. For maximum emi reduction, each of the controller switches needs to be equally out of phase with one another. Thus, if there is only one slave, the switch, such as 68, would be controlled to turn ON 180 degrees out of phase with the switch 44 in the master unit. Thus, the charge and discharge of capacitor 38 is complementary and output voltage ripple is reduced significantly. If two slave units were used, one slave unit would have the switch leg operating 120 degrees out of phase with the master, while the second slave unit would be operating 240 degrees out of phase with the master for maximum ripple reduction.

In the above discussion, converter 22 has been labeled a master unit, since it is shown as containing two CTs. Although a preferred embodiment of the invention physically placed the average current controller 50 within the master unit, it could be placed externally, whereby the only difference between slave and master units is the second CT 30.

The operation of each type of controller unit (average current and peak current) is well known in the art and is further described in the reference material listed previously and thus will not be repeated here. The circuitry illustrated in FIG. 1 and its equivalents allow a single average current controller to control, in part, the operation of the switch leg in a plurality of units without the problem of substantially unequal current magnitude division between units. The use of the peak current controller in each unit maintains substantially equal division of current magnitude between the controller boxes.

Although the invention has been described with reference to a specific embodiment as applied to a boost converter, these descriptions are not meant to be construed in a limiting sense. Various modifications of the disclosed embodiments, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A method of operating a plurality of power factor correction converters, having a switch leg in each converter, connected between a bridge rectifier and a load, comprising the steps of:

providing a peak current mode control signal in each converter;

providing an average current mode control signal based upon master phase currents in one of said converters; and logically combining the peak current control mode signal with the average current control mode to control current flow through said switch leg of each converter of said plurality.

2. A method of operating a plurality of power factor correction converters, having a switch leg in each converter, connected between a bridge rectifier and a load, comprising the steps of:

providing a peak current mode control signal in each converter;

providing an average current mode control signal based upon phase currents in one of said converters; and logically combining the peak control mode signal with an average control signal before utilizing same to control current flow through said switch leg of each converter of said plurality.

3. A method of controlling a switch leg current in a plurality of power factor correction converters operating between a bridge rectifier and a load, comprising the steps of:

determining a peak current in the switch leg of each of the plurality of converters;

generating a first control signal for each converter in accordance with the detected peak current;

determining the currents in the switch and non-switched legs of one of the plurality of converters;

summing and adding the currents in the switch and non-switched legs of one of the plurality of converters to generate a second control signal; and logically combining the first and second control signals and thereafter applying the resulting combination to control current flow through the switch leg of each of the plurality of converters.

4. Apparatus for controlling switch leg current in a plurality of interleaved power factor correction converters operating between a bridge rectifier and a load, comprising:

peak current determining means in the switch leg of each of said plurality of converters, each peak current determining means providing a peak current first control signal;

average current determining means operating in accordance with currents detected in both the switched and non-switched legs of one of said plurality of converters, said average current determining means operating to generate a second control signal; and switch control means, for each of said plurality of converters, connected to receive said first and second control signals from said peak and average current determining means, respectively, said switch control means logically combining the first and second control signals before applying same to control current flow through said switch leg of each respective one of said plurality of converters.

5. Apparatus utilized in controlling the operation of a plurality of interleaved power factor correction converters, having a switch leg in each converter, connected between a bridge rectifier and a load, comprising:

switch leg peak current detecting means in each converter that generates a first control signal;

switch and non-switched leg average current detecting means, operating in accordance with the currents detected in only one of said plurality of converters generating a second control signal; and a plurality of control signal combining means, each operationally communicating with a specific one of said converters, connected to receive said first and second control signals from said peak and average current detecting means, the combining means operating to logically combine said first and second control signals, whereby the resultant signal of the combination controls current flow through said switch leg of each converter of said plurality.

6. Apparatus for operating a plurality of power factor correction converters, having a switch leg and a non-switch leg in each converter, connected between a bridge rectifier and a load, comprising:

a peak current detector in each converter;

a single average current detector operating to generate an average current control signal based upon in phase currents in one of said converters; and signal combining means, operationally connected to said peak and average current detectors, whereby signals generated by the detectors are received and logically combined, thereby producing a switch leg control signal for a given converter operationally utilizing a given peak detector; and a switch in the switch leg of the given converter connected to said signal combining means and operating in accordance with said switch leg control signal.

* * * * *

UNITED STATES PATENT AND TRADEMARK OFFICE
CERTIFICATE OF CORRECTION

PATENT NO. : 6,690,589 B2
DATED : February 10, 2004
INVENTOR(S) : Barnett et al.

It is certified that error appears in the above-identified patent and that said Letters Patent is hereby corrected as shown below:

Column 6,
Line 17, delete "and"

Signed and Sealed this

Sixteenth Day of November, 2004

JON W. DUDAS
*Director of the United States Patent and Trademark Office*